(12) United States Patent
Xie et al.

(10) Patent No.: US 12,390,744 B2
(45) Date of Patent: Aug. 19, 2025

(54) SPIRAL-FLOW TYPE FLUIDIZED-BED COOLING CRYSTALLIZATION SYSTEM

(71) Applicant: THE INSTITUTE OF SEAWATER DESALINATION AND MULTIPURPOSE UTILIZATION, MNR(TIANJIN), Tianjin (CN)

(72) Inventors: Chungang Xie, Tianjin (CN); Shaoyan Lu, Tianjin (CN); Wenyan Zhang, Tianjin (CN); Licong Wang, Tianjin (CN); Laibo Ma, Tianjin (CN); Liang Wang, Tianjin (CN)

(73) Assignee: THE INSTITUTE OF SEAWATER DESALINATION AND MULTIPURPOSE UTILIZATION, MNR(TIANJIN), Tianjin (CN)

( * ) Notice: Subject to any disclaimer, the term of this patent is extended or adjusted under 35 U.S.C. 154(b) by 599 days.

(21) Appl. No.: 17/866,056

(22) Filed: Jul. 15, 2022

(65) Prior Publication Data
US 2023/0046026 A1 Feb. 16, 2023

(30) Foreign Application Priority Data
Aug. 11, 2021 (CN) .......................... 202110919957.6

(51) Int. Cl.
*B01D 9/00* (2006.01)
*B01D 21/26* (2006.01)
(52) U.S. Cl.
CPC ......... *B01D 9/0036* (2013.01); *B01D 9/0013* (2013.01); *B01D 9/0059* (2013.01); *B01D 21/262* (2013.01); *B01D 2009/0086* (2013.01)

(58) Field of Classification Search
CPC .. B01D 9/0004; B01D 9/0036; B01D 9/0013; B01D 9/0059; B01D 21/262; B01D 2009/0086
See application file for complete search history.

(56) References Cited

U.S. PATENT DOCUMENTS

| | | | |
|---|---|---|---|
| 3,177,265 A | 4/1965 | Lammers | |
| 4,588,414 A | 5/1986 | Takegami et al. | |

FOREIGN PATENT DOCUMENTS

| | | |
|---|---|---|
| CN | 1239099 A | 12/1999 |
| CN | 102641607 A | 8/2012 |
| CN | 104162288 A | 11/2014 |

(Continued)

*Primary Examiner* — Timothy C Cleveland

(57) ABSTRACT

The disclosure discloses a spiral-flow type fluidized-bed cooling crystallization system. The system comprises a first fluidized-bed crystallizer, a second fluidized-bed crystallizer, a crystal growing tank, a centrifuge, a circulating pump, a flow control valve, a densimeter and the like, wherein vertical heat transfer pipes are arranged in the first fluidized-bed crystallizer and the second fluidized-bed crystallizer, and scraping particles are contained in the heat transfer pipes. According to the invention, feed liquid exchanges heat with a cooling medium through the vertical heat transfer pipes; meanwhile, spiral spray heads at the bottoms of the heat transfer pipes are used for enabling the feed liquid in the pipes to form a spiral flow field, and the scraping particles are efficiently driven to continuously impact and crush crystals attached to heat transfer wall faces, so the effects of heat transfer enhancement, heat transfer wall face self-cleaning.

1 Claim, 4 Drawing Sheets

(56) References Cited

FOREIGN PATENT DOCUMENTS

| | | | |
|---|---|---|---|
| CN | 105727576 | A | 7/2016 |
| CN | 105797422 | A | 7/2016 |
| CN | 108101777 | A | 6/2018 |
| CN | 108939599 | A | 12/2018 |
| EP | 0730893 | A1 | 9/1996 |
| WO | WO-03069247 | A1 * | 8/2003 ............. F28D 13/00 |

* cited by examiner

SPIRAL-FLOW TYPE FLUIDIZED-BED COOLING CRYSTALLIZATION SYSTEM

CROSS-REFERENCE TO RELATED APPLICATION

This application claims priority from the Chinese patent application 2021109199576 filed Aug. 11, 2021, the content of which is incorporated herein in the entirety by reference.

TECHNICAL FIELD OF THE APPLICATION

The present disclosure belongs to the technical field of chemical crystallization, and in particular to a spiral-flow type fluidized-bed cooling crystallization system for realizing fluidized-bed cooling crystallization by utilizing spiral-flow particles.

BACKGROUND ART

In the preparation process of petroleum, chemical industry, pharmacy, etc., the product obtained after the reaction needs to be crystallized and separated to obtain a product of a certain purity. The above preparation process usually will generate a large amount of waste water containing sodium sulfate, sodium nitrate, organic matter and other components. Direct discharge of waste water will not only cause environmental pollution, but also cause waste of resources. If the feed liquid or waste water is crystallized by an evaporation method, a crystal mixture composed of various salt components is usually obtained, and a large amount of crystallization waste residue is produced, which would cause secondary pollution if improperly treated. Cooling crystallization is a method of separation or purification by using the difference in solubility of salt at different temperatures (generally, high solubility at high temperature and low solubility at low temperature). Usually, the higher temperature saturated solution is cooled to precipitate crystals. This method has the characteristics of high product purity, good separation effect, low energy consumption and high recovery rate. It can effectively recycle the useful resources in feed liquid or wastewater, which can not only obtain industrial products, reduce production costs, but also be conducive to environmental protection and reduce the burden on enterprises.

According to different cooling methods, there are mainly three types of cooling crystallizer at present, which are: dividing wall cooling, natural cooling and direct contact cooling. Among them, dividing wall cooling is the most widely used cooling crystallizer in industrial crystallization. However, it has the disadvantages that the surface of the cooling heat exchange is easy to "scar" and difficult to clean, so that the cooling effect is reduced, and it needs to stir the liquid during crystallization, so that the energy consumption of equipment operation is high. Natural cooling is to place a solution in the atmosphere and naturally cool for crystallization. It has the advantages that the equipment is simple and the operation is convenient. But this method cannot control the crystallization process, the product quality is difficult to guarantee, and has disadvantage of small production capacity, which can only be applied in small-scale production. The direct contact cooling method is to cool by directly contacting a coolant with a solution. Usually, air or hydrocarbons that are immiscible with the solution are used as coolants. Considering the incompatibility between the coolant and the recovered material, this method still has certain limitations.

SUMMARY OF THE DISCLOSURE

An object of the present disclosure is to overcome the deficiencies of the prior art and to provide a spiral-flow type fluidized-bed cooling crystallization system.

The technical solution of the present disclosure is summarized as follows:

A spiral-flow type fluidized-bed cooling crystallization system comprises a first fluidized-bed crystallizer 1 and a second fluidized-bed crystallizer 2 with the same internal structure, and further comprises a crystal growing tank 3. The crystal growing tank 3 is located above the first fluidized-bed crystallizer 1 and the second fluidized-bed crystallizer 2. A feed liquid outlet 14 provided at an upper part of the crystal growing tank is connected to a first valve 41 and a lower part of the first fluidized-bed crystallizer 1 in sequence via pipelines. A top of the first fluidized-bed crystallizer 1 is connected to a second valve 42, a flow control valve 6 and a circulating pump 5 in sequence via pipelines, and then connected to a lower part of the second fluidized-bed crystallizer 2. A top of the second fluidized-bed crystallizer 2 is connected to a third valve 43 and a feed liquid inlet 12 of the crystal growing tank 3 in sequence via pipelines. A top of the crystal growing tank 3 is provided with a feeding port 8 and an exhaust port 9. A fourth valve 44 is provided on the pipeline connected to the feeding port 8, a fifth valve 45 is provided on the pipeline connected to the exhaust port 9, and a cooling medium discharge port 15 is provided on an upper part of the crystal growing tank 3. A sixth valve 46 is provided on the pipeline connected to the cooling medium discharge port 15, and a densimeter 7 is provided in the middle and lower part of the crystal growing tank 3. A cooling medium pipeline 13 is connected to a T-junction 16, and an outlet of the T-junction is connected to a seventh valve 47 via pipelines and then connected to the lower part of the first fluidized-bed crystallizer 1. The other outlet of the T-junction is connected to an eighth valve 48 via pipelines and then connected to the lower part of the second fluidized-bed crystallizer 2. A first cooling medium outlet 17 at the upper part of the first fluidized-bed crystallizer 1 is connected to a ninth valve 49 and a tenth valve 50 in sequence via pipelines and then connected to a cooling medium inlet 19 in the middle and lower part of the crystal growing tank 3. A second cooling medium outlet 18 at the upper part of the second fluidized-bed crystallizer 2 is connected to an eleventh valve 51 and the tenth valve 50 in sequence. The pipeline connected to a bottom of the crystal growing tank is divided into two branches, wherein one branch is connected to a twelfth valve 52 and a centrifuge 4 in sequence; and the other is an impurity discharging pipe, wherein the impurity discharging pipe is provided with a sixteenth valve 56, and the centrifuge is connected to a discharge port 10 and a feed mother liquor discharge port 24. The feed mother liquor discharge port 24 is connected to a thirteenth valve 53 and the flow control valve 6 in sequence via pipelines. A first residual feed liquid discharge port 57 is provided at the bottom end of the first fluidized-bed crystallizer, and the first residual feed liquid discharge port is connected to a fourteenth valve 54 via pipelines. A second residual feed liquid discharge port 58 is provided at the bottom end of the second fluidized-bed crystallizer, and the second residual feed liquid discharge port is connected to a fifteenth valve 55 via pipelines. The first fluidized-bed crystallizer comprises a first crystallizer housing 28, an upper tube plate 25 and a lower tube plate 27 are respectively provided at an upper part and a lower part inside the first crystallizer housing, and two ends of a heat transfer pipe 29 are respectively connected to the upper tube plate and the lower tube plate, and a baffle plate 26 is provided outside the heat transfer pipe. The heat transfer pipe 29 comprises a heat transfer pipe body 34, the lower end of which is provided with a filter screen 30, and a trapping net 33 is provided at a top end of the heat transfer pipe body. A spiral spray head 31 is provided above the filter screen, and scraping particles 32 are provided between the spiral spray head and the trapping net. The spiral spray head 31 is a cylinder having an outer surface provided with a spiral channel 36.

The present disclosure has following advantages:

(1) In the present disclosure, the scraping particles in the heat transfer pipe body are used to make the feed liquid form a spiral flow field in the heat transfer pipe body using the spiral spray head at the bottom of the heat transfer pipe body, so as to drive the scraping particles to continuously impact and break crystals adhering to the heat transfer wall surface, playing the role of strengthening heat transfer, inducing crystallization, and self-cleaning of heat transfer walls, thereby significantly improving the dividing-wall type heat transfer efficiency between the cooling medium and the feed liquid. The present disclosure overcomes the disadvantages of the conventional dividing wall cooling crystallizer, such as low heat transfer coefficient, small effective heat transfer temperature difference, frequent cleaning and maintenance, and difficult scale-up. The present disclosure has faster feed liquid cooling rate and lower energy consumption of operation. Moreover, the equipment needs less heat exchange materials, and the structure is more compact.

(2) In the present disclosure, the spiral spray head is provided at the bottom of each heat transfer pipe of the fluidized bed, and the feed liquid forms the spiral flow field inside the heat transfer pipe, the scraping particles rotate along the heat transfer pipe wall under the action of centrifugal force. Compared with the traditional bulk fluidized-bed, this method can reduce the ineffective collision between scraping particles, and increase the relative velocity and collision frequency between scraping particles and heat transfer wall, to enhance the scraping ability and effectively prevent the "scab" of heat transfer wall.

(3) The present disclosure uses the scraping particles in the fluidized-bed as seeds for inducing the crystallization of the feed liquid, thereby reducing the supersaturation during the crystallization of the chemical product, preventing the occurrence of "explosive" crystallization and improving the controllability of the crystallization process. In addition, inducing crystallization by scraping particles can also promote the formation process of crystal nuclei in the feed liquid, accelerate the growth and development cycle of crystals, and improve the production efficiency of products.

(4) The present disclosure makes use of the continuous collision and friction between the scraping particles and the crystal in the fluidized-bed, so that the size of the crystal particle diameter can be uniform, which lays a foundation for the uniform growth of crystals. The crystals initially formed in the fluidized bed may be further enlarged in the crystal growing tank to provide good conditions for solid-liquid separation. The above method can ensure the particle size and uniformity of the prepared product meet the requirements of industrial production.

(5) The present disclosure installs the fluidized-bed crystallizers in series, and the feed liquid can be cooled down step by step in one process. The cooling liquid after heat exchange enters the crystal growing tank, and the remaining cooling capacity of the cooling liquid is used to maintain the low-temperature environment of the mother liquor, and promote the formation of crystals to become larger. The cooling rate and end temperature of feed liquid can be effectively controlled by this cooling method, which is beneficial to improving the recovery rate of product.

DETAILED DESCRIPTION OF THE DISCLOSURE

The present disclosure will now be further described with reference to the accompanying drawings.

Figure 1:
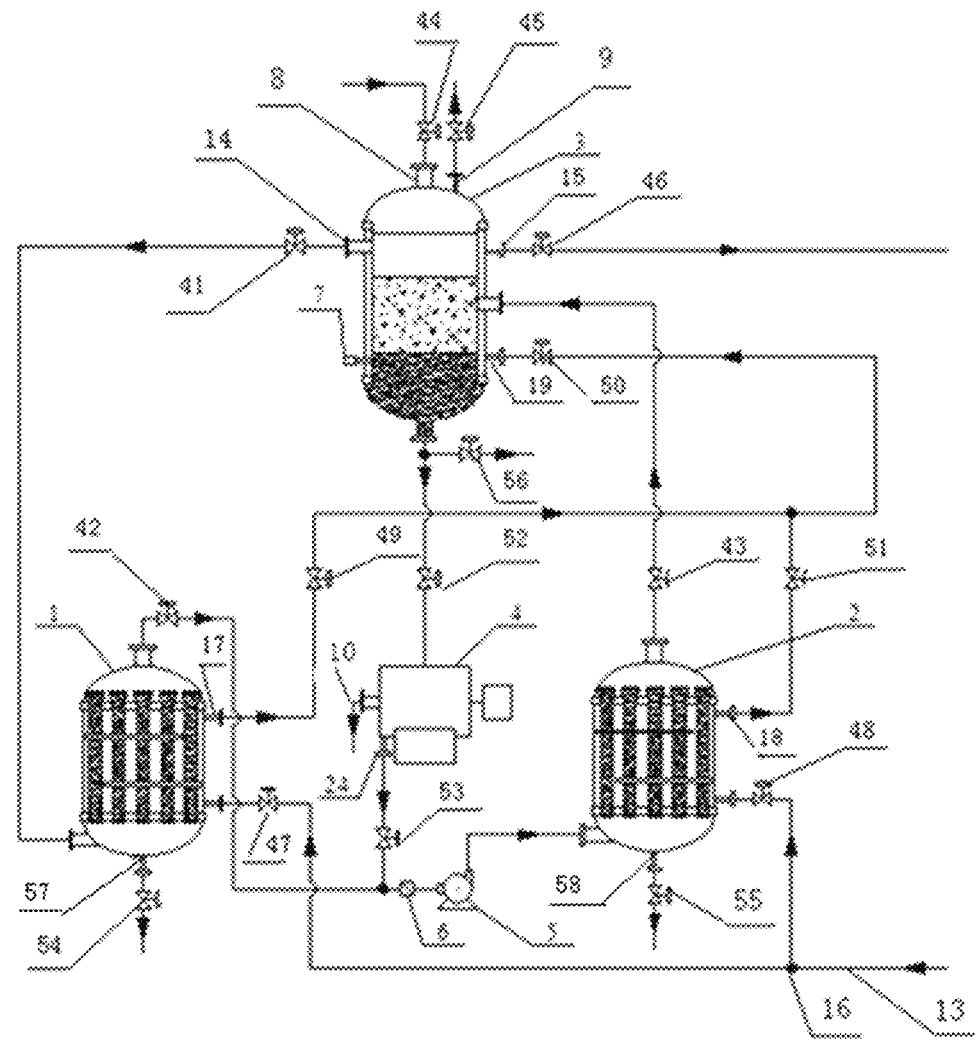
FIG. 1 is a structural schematic diagram of a spiral-flow type fluidized-bed cooling crystallization system of the present disclosure.
Figure 2:
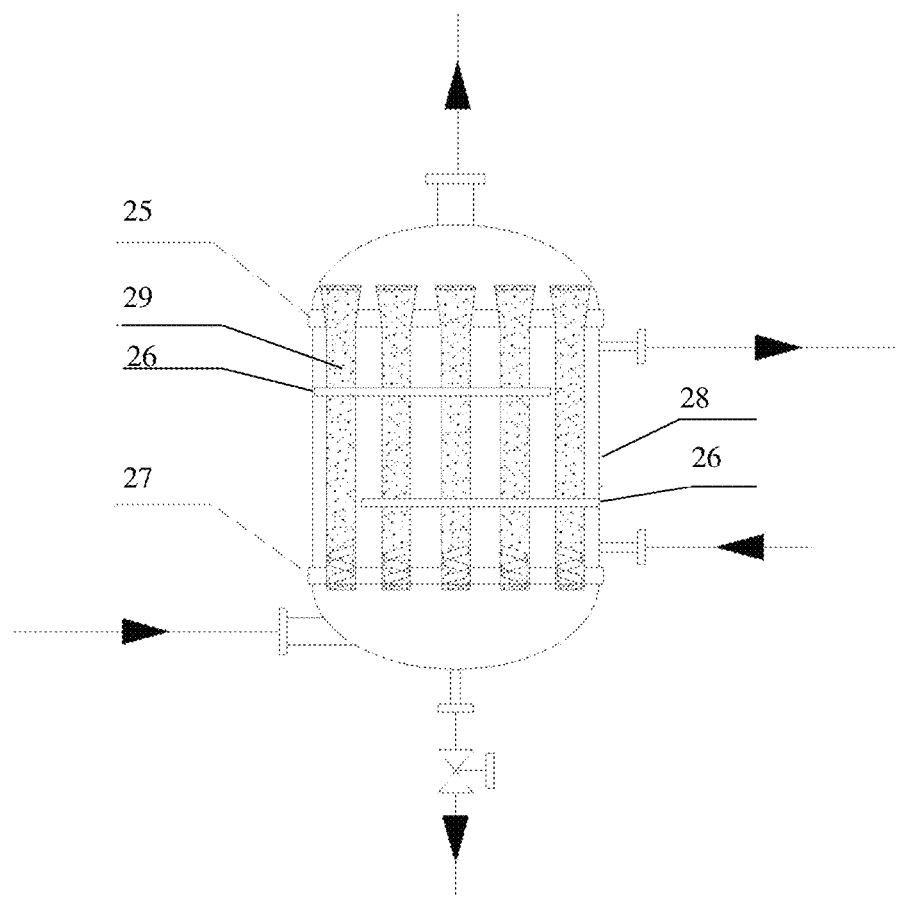
FIG. 2 is a structural schematic diagram of a fluidized-bed crystallizer of the present disclosure.
Figure 3:
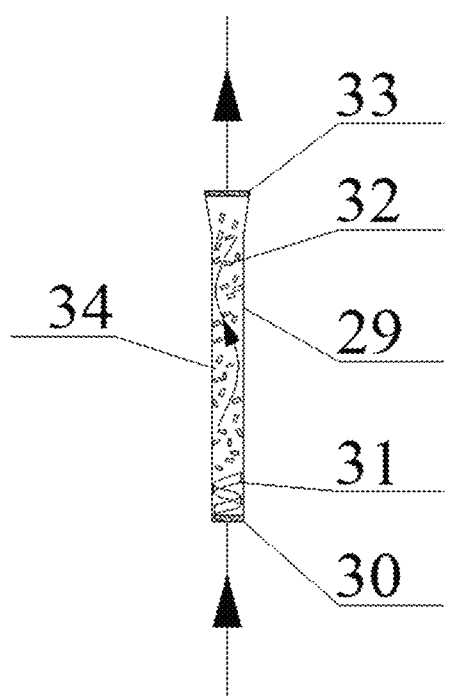
FIG. 3 is a structural schematic diagram of a heat transfer pipe in a fluidized-bed crystallizer.
Figure 4:
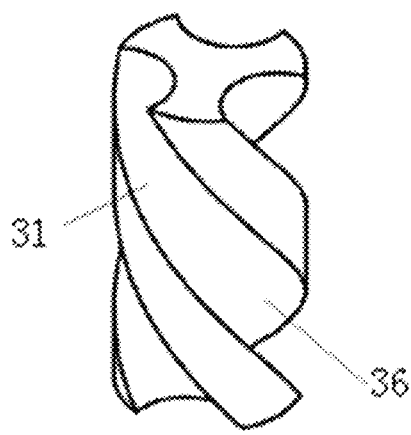
FIG. 4 is a structural schematic diagram of a spiral spray head in the heat transfer pipe.

A spiral-flow type fluidized-bed cooling crystallization system (referring to FIG. 1), comprising a first fluidized-bed crystallizer 1 and a second fluidized-bed crystallizer 2 with the same internal structure, and further comprising a crystal growing tank 3. The crystal growing tank 3 is located above the first fluidized-bed crystallizer 1 and the second fluidized-bed crystallizer 2. A feed liquid outlet 14 provided at an upper part of the crystal growing tank is connected to a first valve 41 and a lower part of the first fluidized-bed crystallizer 1 in sequence via pipelines. The top of the first fluidized-bed crystallizer 1 is connected to a second valve 42, a flow control valve 6 and a circulating pump 5 in sequence via pipelines, and then connected to a lower part of the second fluidized-bed crystallizer 2. A top of the second fluidized-bed crystallizer 2 is connected to a third valve 43 and a feed liquid inlet 12 of the crystal growing tank 3 in sequence via pipelines. A top of the crystal growing tank 3 is provided with a feeding port 8 and an exhaust port 9. A fourth valve 44 is provided on the pipeline connected to the feeding port 8, a fifth valve 45 is provided on the pipeline connected to the exhaust port 9, and a cooling medium discharge port 15 is provided on an upper part of the crystal growing tank 3. A sixth valve 46 is provided on the pipeline connected to the cooling medium discharge port 15, and a densimeter 7 is provided in the middle and lower part of the crystal growing tank 3. A cooling medium pipeline 13 is connected to a T-junction 16, and an outlet of the T-junction is connected to a seventh valve 47 via pipelines and then connected to the lower part of the first fluidized-bed crystallizer 1, the other outlet of the T-junction is connected to an eighth valve 48 via pipelines and then connected to the lower part of the second fluidized-bed crystallizer 2. A first cooling medium outlet 17 at the upper part of the first fluidized-bed crystallizer 1 is connected to a ninth valve 49 and a tenth valve 50 in sequence via pipelines and then connected to a cooling medium inlet 19 in the middle and lower part of the crystal growing tank 3. The second cooling medium outlet 18 at the upper part of the second fluidized-bed crystallizer 2 is connected to an eleventh valve 51 and the tenth valve 50 in sequence. The pipeline connected to a bottom of the crystal growing tank is divided into two branches, wherein one branch is connected to a twelfth valve 52 and a centrifuge 4 in sequence; and the other is an impurity discharging pipe, wherein the impurity discharging pipe is provided with a sixteenth valve 56, and the centrifuge is connected to a discharge port 10 and a feed mother liquor discharge port 24. The feed mother liquor discharge port 24 is connected to a thirteenth valve 53 and the flow control valve 6 in sequence via pipelines. A first residual feed liquid discharge port 57 is provided at the bottom end of the first fluidized-bed crystallizer, and the first residual feed liquid discharge port is connected to a fourteenth valve 54 via pipelines. A second residual feed liquid discharge port 58 is provided at the bottom end of the second fluidized-bed crystallizer, and the second residual feed liquid discharge port is connected to a fifteenth valve 55 via pipelines. The first fluidized-bed crystallizer comprises a first crystallizer housing 28 (referring to FIG. 2), and an upper tube plate 25 and a lower tube plate 27 are respectively provided at an upper part and a lower part inside the first crystallizer housing, and two ends of a heat transfer pipe 29 (referring to FIG. 3) are respectively connected to the upper tube plate and the lower tube plate; a baffle plate 26 is provided outside the heat transfer pipe. The heat transfer pipe 29 comprises a heat transfer pipe body 34, the lower end of which is provided with a filter screen 30, and a trapping net 33 is provided at a top end of the heat transfer pipe body. A spiral spray head 31 is provided above the filter screen, and scraping particles 32 are provided between the spiral spray head and the trapping net. The spiral spray head 31 (referring to FIG. 4) is a cylinder having an outer surface provided with a spiral channel 36.

The first/second/) fluidized-bed crystallizer may be selected to have a diameter of 1 m and a height of 2.5 m, and 90 heat transfer pipes are installed therein. The liquid level of the feed liquid in the crystal growing tank 3 is more than 3 meters higher than the feed liquid outlet at the top of the first fluidized-bed crystallizer 1 and the top of the second fluidized-bed crystallizer 2. The crystal growing tank 3 has a diameter of 2.5 m and a height of 3.5 m. The feed liquid flows out from the feed liquid outlet 14 at the upper part of the crystal growing tank, and enters the first fluidized-bed crystallizer 1 driven by a liquid level differential pressure; and the feed liquid enters each heat transfer pipe of the first fluidized-bed crystallizer 1 from bottom to top driven by pressure from a lower end cover of the first fluidized-bed crystallizer 1. The heat transfer pipe is made of stainless steel, and preferably has a diameter of 50 mm, a length of 700 mm and a wall thickness of 2.5 mm. The baffle plate is provided to enhance the disturbance of the cooling fluid in the fluidized-bed crystallizer housing. The cooled feed liquid enters an upper end cover of the first fluidized-bed crystallizer, and exits from the feed liquid outlet at the top of the first fluidized-bed crystallizer 1 through the second valve 42 and enters the second fluidized-bed crystallizer 2 driven by the circulating pump 5.

The filter screen 30 is provided at the lower end portion of the heat transfer pipe body so as to prevent the scraping particles 32 in the heat transfer pipe body from falling out of the heat transfer pipe body under the action of gravity. The filter screen 30 is made of a stainless-steel material and has a pore size of 4 mm, which is smaller than the particle size of the scraping particles and larger than the particle size of the crystals. The spiral spray head is arranged in the heat transfer pipe along an upper part of the filter screen. The feed liquid forms a spiral flow field in the heat transfer pipe via the spiral spray head. Preferably, each heat transfer pipe is filled with 400 scraping particles 32. The scraping particle has a material density of greater than that of the feed liquid, such as stainless steel, and a structure form of cylinder (6 mm in diameter and 6 mm in length), sphere, vertebral body, etc. The scraping particles continue to collide and tumble along the inner wall of the heat transfer pipe body under the combined action of centrifugal force and hydrodynamic force, thereby separating the crystal particles formed after the feed liquid is cooled from the inner wall of the heat transfer pipe body and flowing out from the upper part of the heat transfer pipe body together with the feed mother liquor. An inverted cone-shaped flared section is provided at the upper part of the heat transfer pipe. The diameter at an outlet of the flared section is 100 mm, and the cross-sectional area at the outlet of the flared section is greater than 2 times of the cross-sectional area outside the flared section of the heat transfer pipe. When the feed liquid passes through the flared section of the heat transfer pipe, the flow rate of the feed liquid drops rapidly. At this time, the hydrodynamic force of the scraping particles will be less than gravity, and the scraping particles will fall back to the lower part of the heat transfer pipe. In order to prevent accidents such as excessive water flow impact, the trapping net is provided at the outlet of the flared section of the heat transfer pipe. The trapping net is configured to seal the scraping particles in the heat transfer pipe. The trapping net 33 is made of stainless steel, and has a diameter of 4 mm, the pore size of which is smaller than the scraping particle size and larger than the crystal size.

The cooling crystallization of the feed liquid in the second fluidized-bed crystallizer 2 is the same as in the first fluidized-bed crystallizer 1.

The flow control valve 6 is provided upstream of the circulating pump 5. The flow control valve 6 is configured to control the circulation flow rate of the feed liquid so as to ensure a superficial flow rate required for the fluidized movement of the scraping particles 32 in the first fluidized-bed crystallizer 1 and the second fluidized-bed crystallizer 2. The circulating pump 5 is selected to have a rated flow of 270 t/h and a head of 10 m. The cooled feed liquid exits the top of the second fluidized-bed crystallizer 2, and passes through the third valve 43 and enters the feed liquid inlet 12 of the crystal growing tank (the crystal growing tank referred to FIG. 5). During system shutdown or cleaning maintenance, the residual feed liquid of the system can be discharged out of the system from the fourteenth valve 54 below the first fluidized-bed crystallizer 1 and the fifteenth valve 55 below the second fluidized-bed crystallizer 2, respectively.

The cooling medium enters the first fluidized-bed crystallizer 1 and the second fluidized-bed crystallizer 2 along the cooling medium pipeline 13 via the seventh valve 47 and the eighth valve 48, respectively. The cooling medium flows out from the first fluidized-bed crystallizer 1 and the second fluidized-bed crystallizer 2 after exchanging heat with the feed liquid through the heat transfer pipes in the fluidized-bed crystallizers. Then the cooling medium passes through pipelines downstream of the ninth valve 49 and the eleventh valve 51 in sequence, reaches the tenth valve 50, and enters the crystal growing tank through the cooling medium inlet 19 of the crystal growing tank. The cooling medium exchanges heat again with the feed liquid through the jacket of the crystal growing tank, and the cooling medium after heat exchange is discharged from the cooling medium discharge port 15 of the crystal growing tank through the sixth valve 46. The cooling medium is preferably chilled water, and the initial temperature when entering the system is 5° C.

Figure 5:
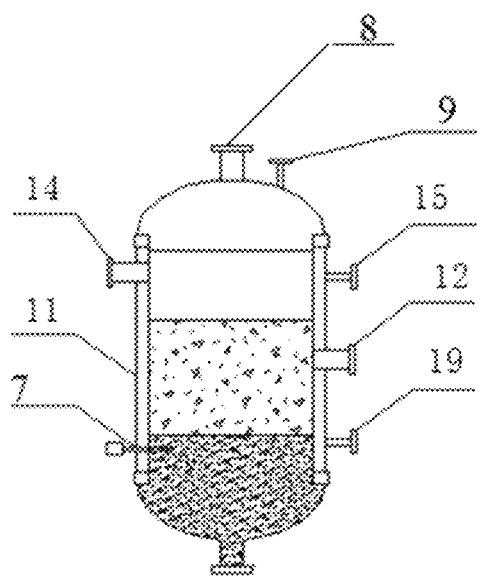
FIG. 5 is a structural schematic diagram of a crystal growing tank of the present disclosure.

The top of the crystal growing tank 3 is provided with the feeding port 8 and the exhaust port 9. The fourth valve 44 is provided on the pipeline for feeding the feed liquid. The feed liquid enters the crystal growing tank via the fourth valve 44 and the feeding port 8 to add fresh feed liquid for the crystallization system. The gas inside the crystal growing tank is discharged to the environment through the exhaust port 9 and the fifth valve 45. A crystal growing tank housing 11 is a jacket-type housing as shown in FIG. 5. The discharge port is provided at the bottom of the crystal growing tank. The cooling medium transfers the remaining cold energy to the feed liquid through the jacketed housing 11 of the crystal growing tank. The primary crystals formed by the fluidized-bed crystallizer are further generated and increased in the low-temperature environment of the crystal growing tank, and are deposited to the bottom of the crystal growing tank under the action of gravity to complete the solid-liquid separation.

The densimeter is used to determine the solid content in the crystal growing tank. When the solid content reaches a set value, the twelfth valve 52 is opened to let the crystals deposited in the crystal growing tank enter the centrifuge 4. The centrifuge 4 is preferably a horizontal scraper-type centrifuge with a rated speed of 1500 r/min and a filter cloth pore size density of 100 mesh. The crystals are separated from the entrained residual feed mother liquor by centrifugation. The separated dried crystals are discharged through the discharge port 10 of the centrifuge. The feed mother liquor is discharged through the feed mother liquor discharge port 24 and the thirteenth valve 53, mixed with the feed liquid discharged from the first fluidized-bed crystallizer 1, and then introduced into the circulating pump 5 together to perform the cooling crystallization process again. Crystallization mother liquor may be discharged out of the system through the valve 56 after a certain number of cycles.

What is claimed is:

1. A spiral-flow type fluidized-bed cooling crystallization system, comprising a first fluidized-bed crystallizer (1) and a second fluidized-bed crystallizer (2) with the same internal structure, and further comprising a crystal growing tank (3); the crystal growing tank (3) being located above the first fluidized-bed crystallizer (1) and the second fluidized-bed crystallizer (2);

wherein a feed liquid outlet (14) provided at an upper part of the crystal growing tank (3) is connected to a first valve (41) and a lower part of the first fluidized-bed crystallizer (1) in sequence via pipelines; a top of the first fluidized-bed crystallizer (1) is connected to a second valve (42), a flow control valve (6) and a circulating pump (5) in sequence via pipelines, and then connected to a lower part of the second fluidized-bed crystallizer (2); a top of the second fluidized-bed crystallizer (2) is connected to a third valve (43) and a feed liquid inlet (12) of the crystal growing tank (3) in sequence via pipelines; a top of the crystal growing tank (3) is provided with a feeding port (8) and an exhaust port (9); a fourth valve (44) is provided on the pipeline connected to the feeding port (8), a fifth valve (45) is provided on the pipeline connected to the exhaust port (9), and a cooling medium discharge port (15) is provided on the upper part of the crystal growing tank (3); a sixth valve (46) is provided on the pipeline connected to the cooling medium discharge port (15), and a densimeter (7) is provided in a middle and lower part of the crystal growing tank (3); a cooling medium pipeline (13) is connected to a T-junction (16), and an outlet of the T-junction is connected to a seventh valve (47) via pipelines and then connected to the lower part of the first fluidized-bed crystallizer (1); an other outlet of the T-junction is connected to an eighth valve (48) via pipelines and then connected to the lower part of the second fluidized-bed crystallizer (2); a first cooling medium outlet (17) at an upper part of the first fluidized-bed crystallizer (1) is connected to a ninth valve (49) and a tenth valve (50) in sequence via pipelines and then connected to a cooling medium inlet (19) in the middle and lower part of the crystal growing tank (3); a second cooling medium outlet (18) at an upper part of the second fluidized-bed crystallizer (2) is connected to an eleventh valve (51) and the tenth valve (50) in sequence; a pipeline connected to a bottom of the crystal growing tank is divided into two branches, wherein one branch is connected to a twelfth valve (52) and a centrifuge (4) in sequence; and a second branch is an impurity discharging pipe, wherein the impurity discharging pipe is provided with a sixteenth valve (56), and the centrifuge is connected to a discharge port (10) and a feed mother liquor discharge port (24); the feed mother liquor discharge port (24) is connected to a thirteenth valve (53) and the flow control valve (6) in sequence via pipelines; a first residual feed liquid discharge port (57) is provided at a bottom end of the first fluidized-bed crystallizer, and the first residual feed liquid discharge port is connected to a fourteenth valve (54) via pipelines; a second residual feed liquid discharge port (58) is provided at a bottom end of the second fluidized-bed crystallizer, and the second residual feed liquid discharge port is connected to a fifteenth valve (55) via pipelines; the first fluidized-bed crystallizer comprises a first crystallizer housing (28); an upper tube plate (25) and a lower tube plate (27) are respectively provided at an upper part and a lower part inside the first crystallizer housing, and two ends of a heat transfer pipe (29) are respectively connected to the upper tube plate and the lower tube plate; a baffle plate (26) is provided outside the heat transfer pipe; the heat transfer pipe (29) comprises a heat transfer pipe body (34), the lower end of which is provided with a filter screen (30), and a trapping net (33) is provided at a top end of the heat transfer pipe body; a spiral spray head (31) is provided above the filter screen, and scraping particles (32) are provided between the spiral spray head and the trapping net; and the spiral spray head (31) is a cylinder having an outer surface provided with a spiral channel (36).

\* \* \* \* \*